United States Patent
Li et al.

(10) Patent No.: US 10,140,265 B2
(45) Date of Patent: Nov. 27, 2018

(54) APPARATUSES AND METHODS FOR PHONE NUMBER PROCESSING

(71) Applicant: Tencent Technology (Shenzhen) Company Limited, Shenzhen, Guangdong (CN)

(72) Inventors: Yingge Li, Guangdong (CN); Tingyong Tang, Guangdong (CN); Zhipei Wang, Guangdong (CN); Hao Tang, Guangdong (CN); Xi Wang, Guangdong (CN); Kai Zhang, Guangdong (CN); Xin Qing, Guangdong (CN); Sirui Liu, Guangdong (CN); Huijiao Yang, Guangdong (CN); Ying Huang, Guangdong (CN); Yulei Liu, Guangdong (CN); Wei Li, Guangdong (CN); Cheng Feng, Guangdong (CN); Bo Hu, Guangdong (CN); Ruiyi Zhou, Guangdong (CN); Lei Guan, Guangdong (CN); Bosen He, Guangdong (CN); Ning Ma, Guangdong (CN); Yang Li, Guangdong (CN)

(73) Assignee: TENCENT TECHNOLOGY (SHENZHEN) CO., LTD., Shenzhen (CN)

(*) Notice: Subject to any disclaimer, the term of this patent is extended or adjusted under 35 U.S.C. 154(b) by 908 days.

(21) Appl. No.: 14/447,272

(22) Filed: Jul. 30, 2014

(65) Prior Publication Data

US 2015/0007019 A1    Jan. 1, 2015

Related U.S. Application Data

(63) Continuation of application No. PCT/CN2014/070945, filed on Jan. 21, 2014.

(30) Foreign Application Priority Data

Jun. 28, 2013    (CN) .......................... 2013 1 0268871

(51) Int. Cl.
  *G06F 17/00* (2006.01)
  *G06F 17/22* (2006.01)
  *G06F 17/30* (2006.01)

(52) U.S. Cl.
  CPC ...... *G06F 17/2247* (2013.01); *G06F 17/2235* (2013.01); *G06F 17/30905* (2013.01)

(58) Field of Classification Search
  CPC ............. G06F 17/03905; G06F 3/0486; G06F 3/04883; G06F 3/0481; H04M 1/72561; G09G 5/00
  See application file for complete search history.

(56) References Cited

U.S. PATENT DOCUMENTS

2004/0205463 A1* 10/2004 Darbie ................ G06F 17/2229
                                                              715/205
2005/0097189 A1    5/2005 Kashi
(Continued)

FOREIGN PATENT DOCUMENTS

CN    101199127 A    6/2008
CN    101355615 A    1/2009
(Continued)

OTHER PUBLICATIONS

International Search Report dated Apr. 28, 2014 in International Application No. PCT/CN2014/070945.
(Continued)

*Primary Examiner* — Quoc A Tran
(74) *Attorney, Agent, or Firm* — Brinks Gilson & Lione

(57) ABSTRACT

A method for phone number processing may comprise providing a terminal device including a processor operating a browser to a user. The processor my conduct the acts of
(Continued)

opening a web page on the browser, wherein the web page includes an unclickable text content; detecting a string from the text content when the user selects the text content; and displaying a phone number processing interface on the web page when the string is a valid phone number.

17 Claims, 5 Drawing Sheets

(56) References Cited

U.S. PATENT DOCUMENTS

| | | | | |
|---|---|---|---|---|
| 2006/0034434 A1* | 2/2006 | Kashi | ................ | G06F 9/543 |
| | | | | 379/93.07 |
| 2014/0040786 A1* | 2/2014 | Swanson | ........... | G06F 17/30899 |
| | | | | 715/760 |

FOREIGN PATENT DOCUMENTS

| | | | |
|---|---|---|---|
| CN | 102663105 A | 9/2012 |
| CN | 102722573 A | 10/2012 |
| CN | 102932317 A | 2/2013 |

OTHER PUBLICATIONS

Written Opinion dated Apr. 28, 2014 in International Application No. PCT/CN2014/070945.
Office Action dated Feb. 1, 2016 for Chinese Application No. 201310268871.7, 7 pages.

* cited by examiner

APPARATUSES AND METHODS FOR PHONE NUMBER PROCESSING

PRIORITY STATEMENT

This application is a continuation of International Application No. PCT/CN2014/070945, filed on Jan. 21, 2014, in the State Intellectual Property Office of the People's Republic of China, which claims the priority benefit of Chinese Patent Application No. 201310268871.7 filed on Jun. 28, 2013, the disclosures of which are incorporated herein in their entirety by reference.

TECHNICAL FIELD

The present disclosure generally relates to Internet technologies. Specifically, the present disclosure relates to apparatus and methods for phone number processing.

BACKGROUND

With the development of Internet network technology, people are able to engage in more and more activities through Internet. For example, people are able to write on twitters, blogs, logs or release announcements of purchases and sales etc. through Internet platforms. People are also able to browse various kinds of web pages, read the blogs, twitters, logs of other people or browse various kinds of announcements through Internet. People are also able to comment or leave messages below webpage content.

Most, if not all, of the information in these twitters, blogs, logs or the released announcements as well as the comments made or the messages left on a web page is ordinary text information. Thus when the information in these web pages includes a phone number, the phone number will not be identified and processed by the web page. Because ordinary readers of the information are generally not professional web page designers, they are not able to perform web page processing which requires specific technologies to the information they read or commented on the web page. The readers who wish to call the phone number will have to manually copy the number and call a phone call software program (or switch to a phone call interface for a smart phone user) to complete the phone call.

SUMMARY

According to an aspect of the present disclosure, a method for phone number processing may comprise providing a terminal device including a processor operating a browser to a user. The processor my conduct the acts of opening a web page on the browser, wherein the web page includes an unclickable text content; detecting a string from the text content when the user selects the text content; and displaying a phone number processing interface on the web page when the string is a valid phone number.

According to another aspect of the present disclosure, a terminal device may comprise a non-transitory processor-readable storage medium in a set of instructions for phone number processing and a processor in communication with the storage medium. The processor may be configured to execute the set of instructions to open a web page on a browser, wherein the web page includes an unclickable text content; detect a string from the text content when a user selects the text content; and display a phone number processing interface on the web page when the string is a valid phone number.

According to yet another aspect of the present disclosure, a non-transitory processor-readable storage medium may comprise a set of instructions for phone number processing. The set of instructions may be configured to direct a processor to perform the acts of opening a web page on a browser, wherein the web page includes an unclickable text content; detecting a string from the text content when a user selects the text content; and displaying a phone number processing interface on the web page when the string is a valid phone number.

BRIEF DESCRIPTION OF THE DRAWINGS

The above and other features and advantages will become more apparent by describing in detail example embodiments thereof with reference to the attached drawings in which.

DETAILED DESCRIPTIONS

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 8:
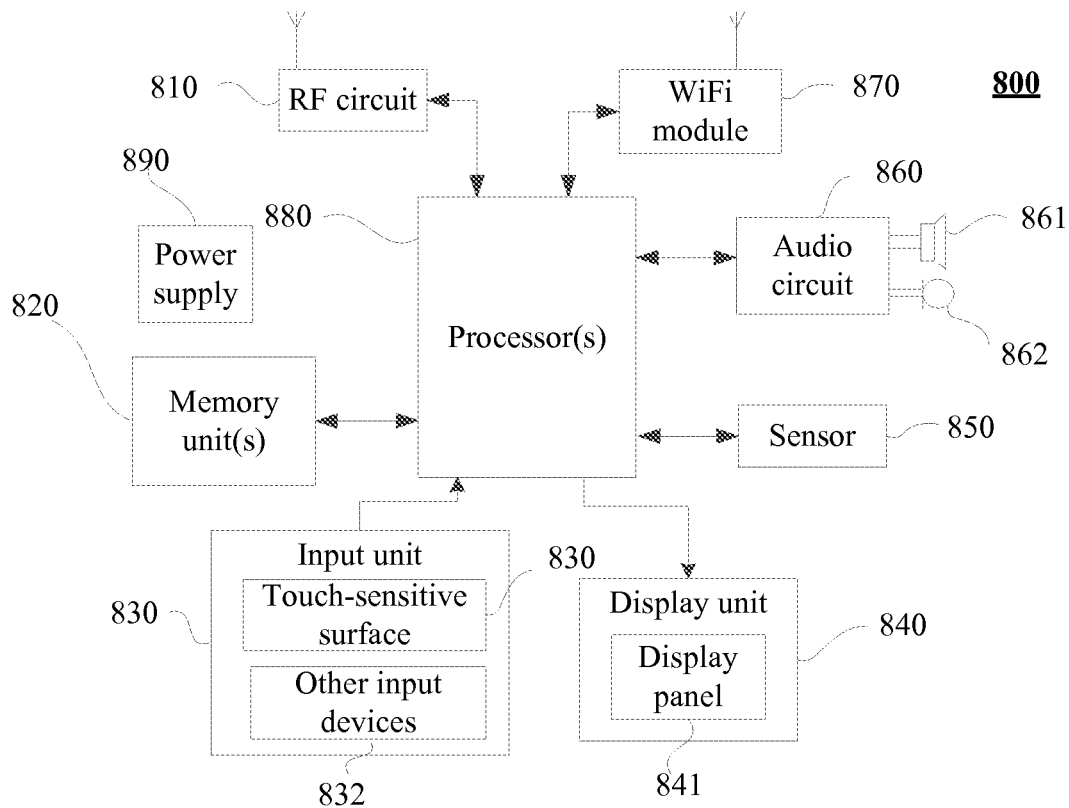
FIG. 8 illustrates an example structural of a terminal device according to the example embodiments of the present disclosure.

FIG. 8 illustrates an example structural of a terminal device according to the example embodiments of the present disclosure. The terminal device may be implemented as systems and/or to operate methods disclosed in the present disclosure.

The terminal device may include an RF (Radio Frequency) circuit 810, one or more than one memory unit(s) 820 of computer-readable memory media, an inpu830t unit 830, a display unit 840, a sensor 850, an audio circuit 860, a WiFi (wireless fidelity) module 870, at least one processor 880, and a power supply 890. Those of ordinary skill in the art may understand that the structure of the terminal device shown in FIG. 8 does not constitute restrictions on the terminal device. Compared with what may be shown in the figure, more or fewer components may be included, or certain components may be combined, or components may be arranged differently.

The RF circuit 810 may be configured to receive and transmit signals during the course of receiving and transmitting information and/or phone conversation. Specifically, after the RF circuit 810 receives downlink information from a base station, it may hand off the downlink information to the processor 880 for processing. Additionally, the RF circuit 810 may transmit uplink data to the base station. Generally, the RF circuit 810 may include, but may be not limited to, an antenna, at least one amplifier, a tuner, one or multiple oscillators, a subscriber identification module (SIM) card, a transceiver, a coupler, an LNA (Low Noise Amplifier), and a duplexer. The RF circuit 810 may also communicate with a network and/or other devices via wireless communication. The wireless communication may use any communication standards or protocols available or one of ordinary skill in the art may perceive at the time of the present disclosure. For example, the wireless communication may include, but not limited to, GSM (Global System of Mobile communication), GPRS (General Packet Radio Service), CDMA (Code Division Multiple Access), WCDMA (Wideband Code Division Multiple Access), LTE (Long Term Evolution), email, and SMS (Short Messaging Service).

The memory unit 820 may be configured to store software programs and/or modules. The software programs and/or modules may be sets of instructions to be executed by the processor 880. The processor 880 may execute various functional applications and data processing by running the software programs and modules stored in the memory unit 820. The memory unit 820 may include a program memory area and a data memory area, wherein the program memory area may store the operating system and at least one functionally required application program (such as the audio playback function and image playback function); the data memory area may store data (such as audio data and phone book) created according to the use of the terminal device. Moreover, the memory unit 820 may include high-speed random-access memory and may further include non-volatile memory, such as at least one disk memory device, flash device, or other volatile solid-state memory devices. Accordingly, the memory unit 820 may further include a memory controller to provide the processor 880 and the input unit 830 with access to the memory unit 820.

The input unit 830 may be configured to receive information, such as numbers or characters, and create input of signals from keyboards, touch screens, mice, joysticks, optical or track balls, which are related to user configuration and function control. Specifically, the input unit 830 may include a touch-sensitive surface 831 and other input devices 832. The touch-sensitive surface 831, also called a touch screen or a touch pad, may collect touch operations by a user on or close to it (e.g., touch operations on the touch-sensitive surface 831 or close to the touch-sensitive surface 831 by the user using a finger, a stylus, and/or any other appropriate object or attachment) and drive corresponding connecting devices according to preset programs. The touch-sensitive surface 831 may include two portions, a touch detection device and a touch controller. The touch detection device may be configured to detect the touch location by the user and detect the signal brought by the touch operation, and then transmit the signal to the touch controller. The touch controller may be configured to receive the touch information from the touch detection device, convert the touch information into touch point coordinates information of the place where the touch screen may be contacted, and then send the touch point coordinates information to the processor 880. The touch controller may also receive commands sent by the processor 880 for execution. Moreover, the touch-sensitive surface 831 may be realized by adopting multiple types of touch-sensitive surfaces, such as resistive, capacitive, infrared, and/or surface acoustic sound wave surfaces. Besides the touch-sensitive surface 831, the input unit 830 may further include other input devices 832, such as the input devices 832 may also include, but not limited to, one or multiple types of physical keyboards, functional keys (for example, volume control buttons and switch buttons), trackballs, mice, and/or joysticks.

The display unit 840 may be configured to display information input by the user, provided to the user, and various graphical user interfaces on the terminal device. These graphical user interfaces may be composed of graphics, texts, icons, videos, and/or combinations thereof. The display unit 840 may include a display panel 841. The display panel 841 may be in a form of an LCD (Liquid Crystal Display), an OLED (Organic Light-Emitting Diode), or any other form available at the time of the present disclosure or one of ordinary skill in the art would have perceived at the time of the present disclosure. Furthermore, the touch-sensitive surface 831 may cover the display panel 841. After the touch-sensitive surface 831 detects touch operations on it or nearby, it may transmit signals of the touch operations to the processor 880 to determine the type of the touch event. Afterwards, according to the type of the touch event, the processor 880 may provide corresponding visual output on the display panel 841. In FIG. 8, the touch-sensitive surface 831 and the display panel 841 realize the input and output functions as two independent components. Alternatively, the touch-sensitive surface 831 and the display panel 841 may be integrated to realize the input and output functions.

The terminal device may further include at least one type of sensor 850, for example, an optical sensor, a motion sensor, and other sensors. An optical sensor may include an environmental optical sensor and a proximity sensor, wherein the environmental optical sensor may adjust the brightness of the display panel 841 according to the brightness of the environment, and the proximity sensor may turn off the display panel 841 and/or back light when the terminal device may be moved close an ear of the user. As a type of motion sensor, a gravity acceleration sensor may detect the magnitude of acceleration in various directions (normally three axes) and may detect the magnitude of gravity and direction when it may be stationary. The gravity acceleration sensor may be used in applications of recognizing the attitude of the terminal device (e.g., switching screen orientation, related games, and magnetometer calibration) and functions related to vibration recognition (e.g., pedometers and tapping); the terminal device may also be configured with a gyroscope, barometer, hygrometer, thermometer, infrared sensor, and other sensors.

An audio circuit 860, a speaker 861, and a microphone 862 may provide audio interfaces between the user and the terminal device. The audio circuit 860 may transmit the electric signals, which are converted from the received audio data, to the speaker 861, and the speaker 861 may convert them into the output of sound signals; on the other hand, the microphone 862 may convert the collected sound signals into electric signals, which may be converted into audio data after they are received by the audio circuit 860; after the audio data may be output to the processor 880 for processing, it may be transmitted via the RF circuit 810 to, for example, another terminal; or the audio data may be output to the memory unit 820 for further processing. The audio circuit 860 may further include an earplug jack to provide communication between earplugs and the terminal device.

WiFi may be a short-distance wireless transmission technology. Via the WiFi module 870, the terminal device may help users receive and send emails, browse web pages, and visit streaming media. The WiFi module 870 may provide the user with wireless broadband Internet access.

The processor 880 may be the control center of the terminal device. The processor 880 may connect to various parts of the entire terminal device utilizing various interfaces and circuits. The processor 880 may conduct overall monitoring of the terminal device by running or executing the software programs and/or modules stored in the memory unit 820, calling the data stored in the memory unit 820, and executing various functions and processing data of the terminal device. The processor 880 may include one or multiple processing core(s). The processor 880 may integrate an application processor and a modem processor, wherein the application processor may process the operating system, user interface, and application programs, and the modem processor may process wireless communication.

The terminal device may further include a power supply 890 (for example a battery), which supplies power to various components. The power supply may be logically connected to the processor 880 via a power management system so that charging, discharging, power consumption management, and other functions may be realized via the power management system. The power supply 890 may further include one or more than one DC or AC power supply, a recharging system, a power failure detection circuit, a power converter or inverter, a power status indicator, and other random components.

Further, the terminal device 800 may also include a camera, Bluetooth module, etc., which are not shown in FIG. 8.

Merely for illustration, only one processor will be described in client devices that execute operations and/or method steps in the following example embodiments. However, it should be note that the client devices in the present disclosure may also include multiple processors, thus operations and/or method steps that are performed by one processor as described in the present disclosure may also be jointly or separately performed by the multiple processors. For example, if in the present disclosure a processor of a client device executes both step A and step B, it should be understood that step A and step B may also be performed by two different processors jointly or separately in the client device (e.g., the first processor executes step A and the second processor executes step B, or the first and second processors jointly execute steps A and B).

Figure 1:
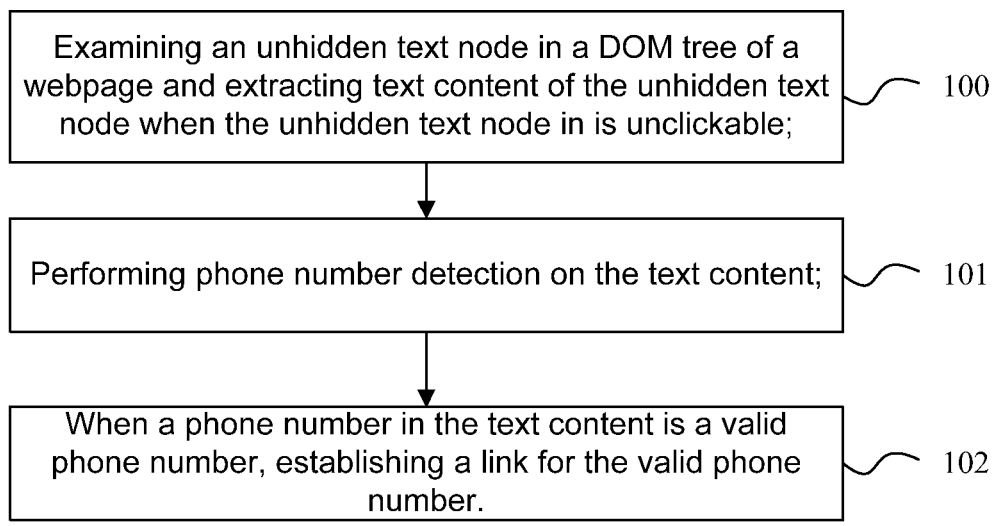
FIG. 1 is a flowchart for a phone number processing method according to example embodiments of the present disclosure.

FIG. 1 is a flowchart of a phone number processing method according to the example embodiments of the present disclosure. The method may be implemented and executed in a terminal device such as terminal device 800. For example, the method may be encoded into a set of instructions and saved in a non-transitory processor-readable storage medium, such as memory 720, and then may be executed by the processor 780. The phone number processing method of the present embodiment may include the following steps:

Step 100: Examining an unhidden text node in a document object model (DOM) tree of a web page. Extracting text content of the text node when the unhidden text node is unclickable.

According to the example embodiments of the present disclosure, the above phone number processing step may be performed over a source code of a web. The web page may be a valid HTML, XHTML and/or XML document. It may adopt a logical structure under a DOM, which is an application programming interface (API) for the HTML, XHTML and/or XML document and defines the logical structure of documents and/or data of the HTML, XHTML and/or XML HTML document. Content of the web page may include a plurality of documents and data. The DOM may organize the documents and/or data under a tree or a forest structure, which can contain one or more trees. Accordingly, with the DOM, programmers can build documents, navigate their structure, and add, modify, or delete elements and content. The DOM may include a plurality of nodes. Each node may be a text node or other types of node, wherein a text node may be displayed as text content in the web page. Further, each node may have an attribute of either being hidden or unhidden on the web page. Content of a hidden node may not be displayed when a browser opens the web page, and content of an unhidden node may be displayed when the browser opens the web page.

An unhidden text node in the DOM tree may be unclickable or clickable. The unhidden text node is unclickable if there is no hyperlink associated with the text of the node. When a user clicks the displayed content corresponding to the text node on a screen of the terminal device, there may have no interface response to the click action, such as no entry into any other link, or no prompting message or dialogue box popping up. Accordingly, a text node may be clickable if there have an interface response to a click action over the corresponding text content displayed on the terminal device.

Because an ordinary user of the web page may only conduct operations over contents that are displayed on the web page, the processor of the terminal device may only process the unhidden node in the DOM tree under the instruction of the user. When a user clicks a target text on the web page, and the text node that corresponds to the target text is unclickable, the processor of the terminal may extract the text content of the text node.

Step 101: Performing phone number detection on the text content.

After the text content is extracted, the processor may perform phone number detection on the text content. To this end, the processor may determine whether the text content includes a phone number string having a predetermined phone number format. For example, the processor may determine that a phone number string is a string of numbers; the string of numbers may include a preceding area code and a phone number; the preceding area code may be three digits or four digits based on the area of the phone number belongs to; and the phone number may be 8 digits or 7 digits based on the area it belongs to. Furthermore, the processor may also determine that the phone number string may also include the country code before the area code, or the phone number may also be an 11 digit cell phone number, or a 5 digit service phone number, etc. Because a phone number may be in various kinds of phone number formats, the processor may compare the phone number string with a database of phone number formats stored in a storage medium, either locally or remotely, so as to make judgment on whether or not the text content includes a phone number with a valid format. For example, the processor may neglect separating characters such as "-" or "*" between an area code and the phone number in the phone number string.

Step 102: When a phone number in the text content is a valid phone number, establishing a link for the valid phone number.

The link may connect the phone number with a phone number processing interface. The phone number interface may be a dialogue box, a prompt message, or an invisible action that directly connects the phone number with a phone call application installed in the terminal, so that when the phone number is clicked, a corresponding dialogue box or a prompting message may pop up, or alternatively the terminal may directly call the phone call application to call the phone number. The dialogue box or the prompt message may provide the user an option as to whether he/she would conduct a phone call to the phone number. The option may be a button or may be a link. If the user selects the button to confirm the phone call, the processor may be directed to call the phone call application and call the phone number. Alternatively, the dialog box or the prompt message may include information associated with the phone number, such as a background search of the phone number, disclosing information such as the owner of the phone number etc.

The web page may be a page of twitters, blogs, logs or released announcements as well as comments or left messages. Because twitters, blogs, logs or released announcements as well as comments or left messages are published by users, and are not professionally processed by professional page designers, the phone numbers therein are not identified and processed. Thus by applying the above method of the present disclosure, the phone numbers in the twitters, blogs, logs or released announcements as well as comments or left messages may be identified and processed timely.

In summary, the phone number processing method according to the example embodiments may perform phone number detection on the text content through extracting the text content of the text node when the unhidden text node in the DOM tree is unclickable, and establishes a link for a valid phone number when the one in the text content is a valid phone number. The method may perform phone number detection on the various phone number strings through selecting a phone number string with a preset length in the text area as the center when the text area is unclickable, and pops up the phone number processing interface when the phone number string is a valid phone number.

Step 100 may further include the following steps:
(1) Determining on whether the unhidden text node include a link; if yes, executing Step (2); otherwise, executing Step (3);
(2) Determining that the unhidden text node is clickable;
(3) Determining that the unhidden text node is unclickable.

Here, the unhidden text node is unclickable when there is no interface response when a user clicks the displayed content corresponding to the text node (or places a mouse pointer over the content), such as no entry into any other link, or no phone number processing interface popping up. If there is an interface response to the click (or places a mouse pointer over the content) action of the user, the text node is clickable. Alternatively, the processor may also determine the clickability based on whether any phone number processing interface pops up when user clicks (or places a mouse pointer over the content) the content displayed. If the phone number processing interface pops up, the text node may be determined to be clickable; otherwise, it may be unclickable.

Further, Step (1) may also include traversing the DOM tree to acquire the unhidden text node in the DOM tree.

Step 102 may further include: creating a label for the text node based on the phone number when the text content is a valid phone number, wherein the label may link the valid phone number to the phone number processing interface; and inserting the label into the DOM tree as a new father node of the unhidden text node, i.e., the processor may insert the label in the DOM tree at the position where the text node is, and then move the text node one level down the DOM tree so that the text node becomes a child node of the label. For example, in Hypertext Markup Language (HTML), an unhidden text node X may be a valid telephone number. Label A may be created for the unhidden text node X, and the Href attribute of Label A may be created as "Tel: A valid phone number". Label A may be inserted into the DOM tree as a new father node of the unhidden text node X. Further the Label A may link the valid phone number to a phone number processing interface, so that when a user clicks the text content of the unhidden text node X that is displayed on the web page, the terminal device may identify the valid phone number in the unhidden text node X, and pop up the phone number processing interface linked to the valid phone number.

Thus the principle of implementing the link (e.g., hyperlink) in the example may be to set up a particular content format (e.g., the valid phone number) for the Href attribute of Label A of the HTML, so that when the browser in client side (e.g., the terminal device) processes this particular link, it may find the valid phone number contained in the Href attribute, and may then call the phone number processing interface.

The newly created Label A may be inserted in the DOM tree to substitute the original position of the unhidden text node X. Consequently, the unhidden text node X may be moved one level down and become a child node of Label A, and the original sibling nodes of the unhidden text node X now become sibling nodes of Label A.

After inserting Label A as the new father node of the text node into the DOM tree, the processor may pop up the phone number processing interface linked to the valid phone number in the text content when the user selects the text content.

For example, the phone number processing interface may include at least one of a title bar, a phone dialing menu configured to dial the valid phone number, a short message sending menu configured to send a short message to the phone number, a contact saving menu configured to save the phone number in a list of contact, and a number copying menu configured to save the phone number in a clip board. The user may select the above options on the phone number processing interface, and the processor of the terminal device may perform the corresponding operations as defined by the options, which may be convenient for the user to use. For example, when the text node includes more than one valid phone numbers, the phone number processing interface linked to each valid phone number may be popped up respectively.

Furthermore, Step 102 may also include: Linking phone number processing interface to the phone number when the text content is a valid phone number; and popping up the phone number processing interface when the user selects the text content through the man-machine interface module.

When the user clicks the phone number, sometimes there is a need to provide a noticing message to the user before dialing the phone number, such as when the phone number is a service phone number. Accordingly, the processor may pop up the phone number processing interface (e.g., the dialogue box and/or the prompting message) to the user. For example, the prompting message may be some basic information on the phone number. For example, when the phone number is "10086", relevant information on China Mobile may pop up when the user clicks the phone number; when the phone number is a caller-paid phone number, an alert message may pop up reminding the user the nature of the phone call he/she will conduct (e.g., by calling this number he/she will be charged an extra amount of money) when the user click the phone number.

In the course for processing a valid phone number in the text content of an unhidden text node in the DOM tree, the processor may traverse the DOM tree to access all the unhidden text nodes in the DOM tree, and processing all the valid phone numbers in the text content of all the unhidden text nodes.

Further, in addition to recognizing valid telephone numbers in pages such as twitters, blogs, logs or the released announcements as well as comments made on a web page, the method may also implemented to recognize other pre-determined content, such as a brand, a product, or any other keywords.

Figure 2:
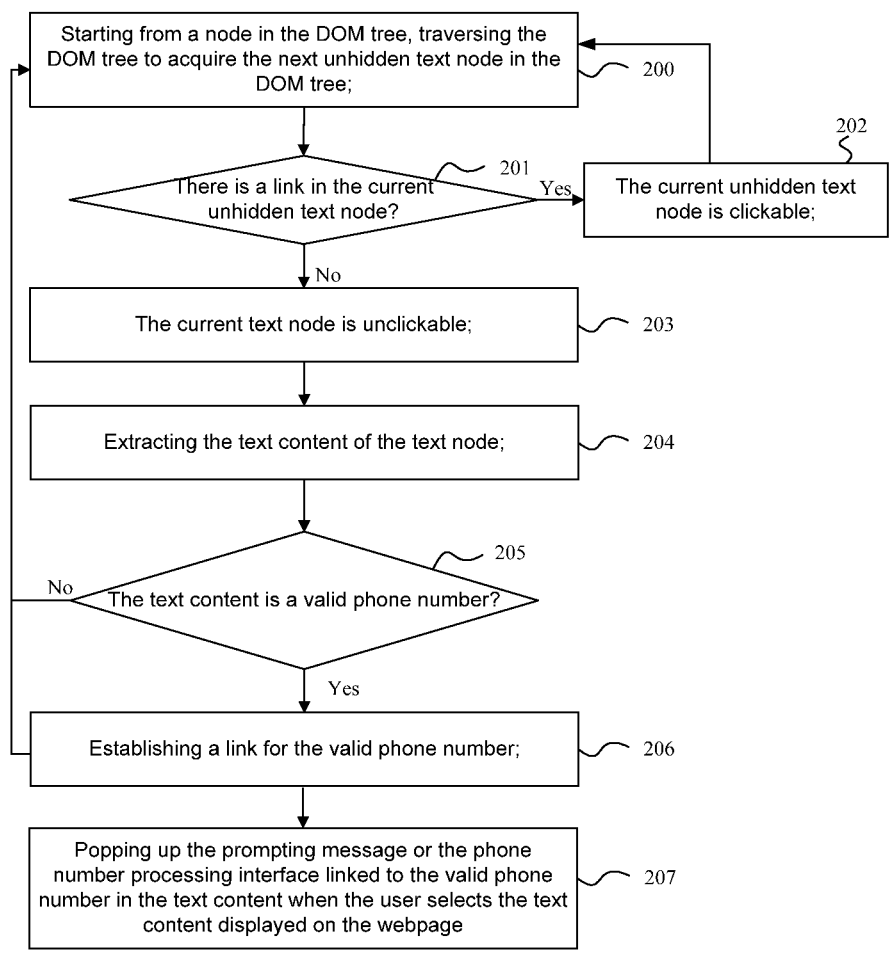
FIG. 2 is a flowchart for a phone number processing method according to the example embodiments of the present disclosure.

FIG. 2 is a flowchart for a phone number processing method according to the example embodiments of the present disclosure. The method may be implemented and executed in a terminal device such as terminal device 800. For example, the method may be encoded into a set of instructions and saved in a non-transitory processor-readable storage medium, such as memory 720, and then may be executed by the processor 780. The method may include the following steps. The steps are described with respect to only one node in the DOM tree. In practical application, the following steps may be applied to traverse the entire DOM tree.

Step 200: Starting from a node in the DOM tree, traversing the DOM tree to acquire the next unhidden text node in the DOM tree.

Step 201: Determining whether there is a link in the current unhidden text node; when there is a link in the text node, execute Step 202; otherwise, when there is no link, execute Step 203. The Step 201 may be used to determine on whether or not the current text node is clickable.

202: Determining that the current unhidden text node is clickable, returning to Step 201 to process the next unhidden text node until exhausting all the nodes in the DOM tree. If the current text node is clickable, it means that the current node already has a click response, and can no longer be processed as a phone number and/or there is no necessary to further determine if it includes a phone number.

203: Determining that the current text node is unclickable.

204: Extracting the text content of the text node.

205: Performing phone number detection on the text content, determining whether the text content is a valid phone number, and when yes, executing Step 206; otherwise, executing Step 200 until exhausting all the nodes in the DOM tree.

206: Establishing a link for the valid phone number; return to Step 200 until exhausting all the nodes in the DOM tree. To this end, the processor may establish a link through setting up Label A; alternatively, the processor may establish a link between the valid phone number and the phone number processing interface.

207. Popping up the prompting message or the phone number processing interface linked to the valid phone number in the text content when the user selects the text content displayed on the webpage.

Figure 3:
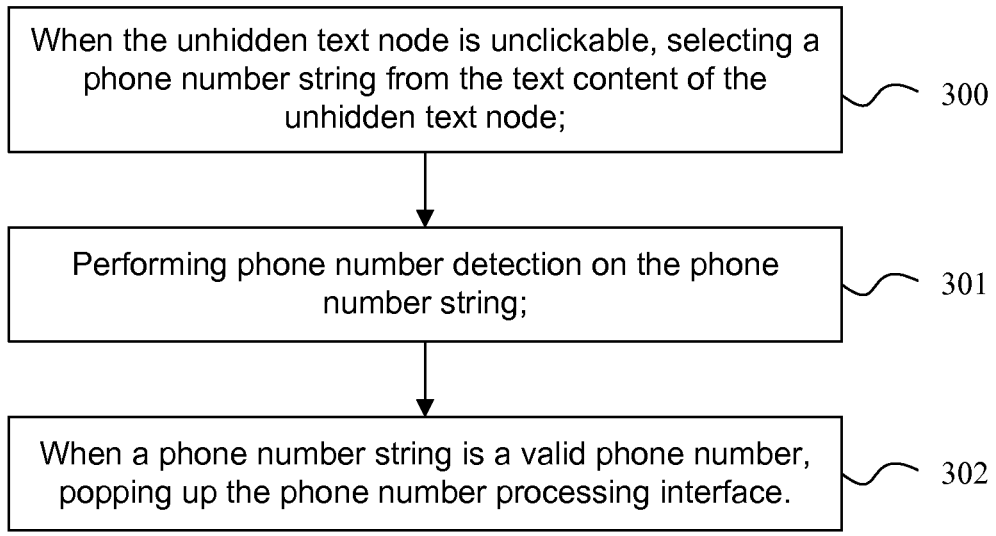
FIG. 3 is a flowchart for a phone number processing method according to the example embodiments of the present disclosure.

FIG. 3 is a flowchart for a phone number processing method according to the example embodiments of the present disclosure. The method may be implemented and executed in a terminal device such as terminal device 800. For example, the method may be encoded into a set of instructions and saved in a non-transitory processor-readable storage medium, such as memory 720, and then may be executed by the processor 780. The method may include the following steps.

Step 300. When the text node is unclickable, selecting a string with a preset length from the text node. The pre-set length may be longer than a telephone number so that if the context of the selected string includes a telephone number, the entire telephone number may be selected.

In the present embodiment, the text area is unclickable, which may be manifested in that, when the user selects the text area through the man-machine interface module, the text area will not show any response, such as popping up the phone number processing interface or popping up a prompting message.

301: Performing phone number detection on the phone number string;

302: When a phone number string is a valid phone number or includes a valid phone number, popping up the phone number processing interface.

The method in FIG. 3 may be applied to real-time process a phone number string when a user clicks the text content on a web page. The Step 301 may adopt a similar implementation mechanism as Step 101.

Step 300 may include: Acquiring a string with a preset length forward and backward beginning from the place of the text content where user clicked, and the preset length may be set up based on actual demand, for example, it may be 20 or 30 or 40 numbers, characters, and/or letters. If the string (e.g., phone number string) acquired after having traversed the text content are still short of the preset length, all web pages may be traversed at this time to acquire a sufficient length. Beginning from the place where the user clicked, the traversing operation may be performed respectively forward and backward, and separating characters may be neglected, until a number, a character, or a string that does not or cannot belong to a phone number is reached, or the traversing has reached the head or end of the text. The processor then may extract the string between the two stop places before and after where the search began (e.g., where the user clicked), and then treat the string as a phone number string. For example, the processor may select a text span window that contains a predetermined number of numbers from where the user clicked, and extract the numbers as a phone number string after removing separating characters therein.

Accordingly, in the phone number processing method of the example embodiment, the processor may perform phone number detection on various phone number strings through selecting a phone number string with a preset length when the text area selected by the user is unclickable. The processor then may pop up the phone number processing interface when the phone number string is a valid phone number. Through the method, the processor may process the phone numbers included in web pages such as twitters, blogs, logs or the released announcements as well as the comments made or the messages left therein.

Before Step 301, the method may further include the following steps:
 (a) Determining whether there is a link in the text area; when there is a link in the text area, executing Step (b); otherwise, when there is no link, executing Step (c);
 (b) Determining that the text area is clickable;
 (c) Determining that the text area is unclickable.

Further, the phone number processing interface may also include at least one of a title bar, a phone dialing menu, a short message sending menu, a contact saving menu, and a number copying menu.

Figure 4:
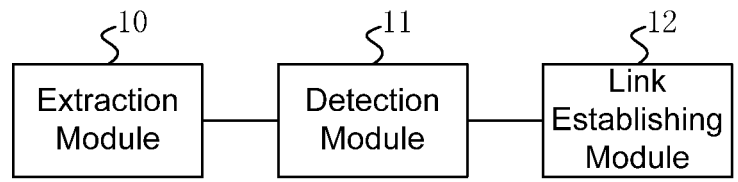
FIG. 4 is a structural representation for a phone number processing apparatus according to the example embodiments of the present disclosure.

FIG. 4 is a structural representation for a phone number processing apparatus according to the example embodiments of the present disclosure. The apparatus may include an extraction module 10, a detection module 11, and a link establishing module 12.

The extraction module 10 may be configured to extract the text content of the unhidden text node when the unhidden text node in the DOM tree is unclickable; the detection module 11 may be connected to the extraction module 10 and may be configured to perform phone number detection on the text content as extracted by the extraction module 10; the link establishing module 12 may be connected to the detection module 11 and may be configured to establish a link for the phone number when the detection module 11 determines that the text content includes a valid phone number.

Thus the apparatus may be configured to to implement extraction of the text content of the text node when the unhidden text node in the DOM tree is unclickable, and establishe a link for a valid phone number when the text content includes a valid phone number. Or the apparatus may perform phone number detection on the various phone number strings through selecting a preset length of phone number strings with the text area as the center when the text area is unclickable, and then pop up the phone number processing interface when the phone number string is a valid phone number.

Figure 5:
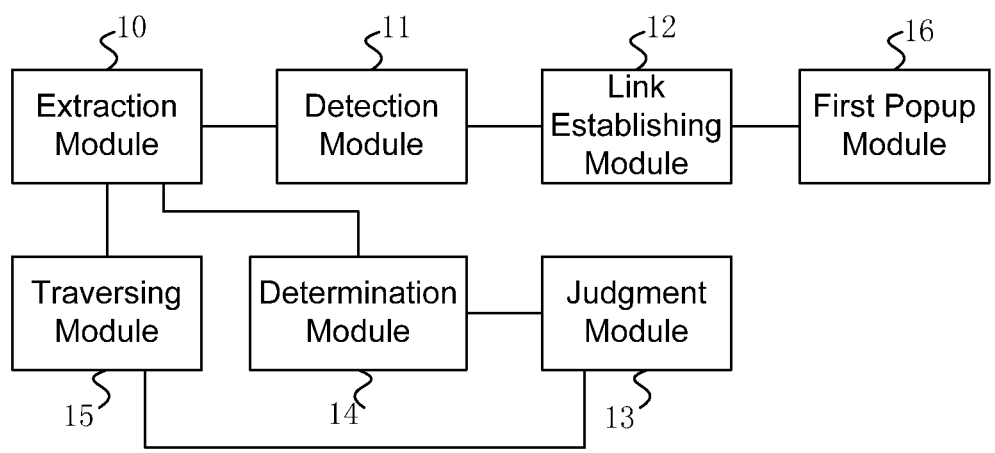
FIG. 5 is a structural representation for a phone number processing apparatus according to the example embodiments of the present disclosure.

FIG. 5 is a structural representation for a phone number processing apparatus according to the example embodiments of the present disclosure. In addition to the elements in the apparatus in FIG. 4, the apparatus in FIG. 5 may also include a judgment module 13 and a determination module 14.

The judgment module 13 may be configured to determine whether there is a link in the unhidden text node, before the extraction module extracts the text content of the text node, when the unhidden text node in the DOM tree is unclickable; the determination module 14 may be connected to the judgment module 13 and configured to determine that the unhidden text node is clickable when the judgment module 13 determines that there is a link in the text node, and to determine that the unhidden text node is unclickable if the judgment module 13 determines that there is no link in the unhidden text node;

Furthermore, the apparatus may also include a traversing module 15. The traversing module 15 may be configured to traverse the DOM tree and acquire the unhidden text node in the DOM tree before the judgment module 13 makes a determination on whether or not there is a link in the text node. The judgment module 13 may be connected to the traversing module 15 and may be configured to determine whether there is a link in the unhidden text node as acquired by the traversing module 15.

The corresponding extraction module 10 may be respectively connected to the determination module 14 and the traversing module 15, and the extraction module 10 may be configured to extract the text content of the unhidden text node as acquired by the traversing module 15 when the determination module 14 determines that the unhidden text node in the DOM tree is unclickable;

Furthermore, the link establishing module 12 may be configured to create a label for the text node based on the valid phone number when the text content includes a valid phone number, wherein the label may link the valid phone number to the phone number processing interface, and to insert the label into the DOM tree as the new father node of the text node. For example, in HTML, to create Label A for the text node, the Href attribute of Label A may be "Tel: A valid phone number" so that the linking of a valid phone number to the phone number processing interface is implemented, and Label A may be inserted into the DOM tree as the new father node of the text node. In this way, when a user clicks the text node, the phone number processing apparatus may identify the valid phone number in the text node, and pop up the phone number processing interface linked to the valid phone number.

Furthermore, apparatus may also include a first popup module 16. The popup module 16 may be connected to the link establishing module 12 and may be configured to pop up the phone number processing interface linked to the valid phone number as established by the link establishing module 12 when the user selects the text content after the link establishing module 12 inserts Label A into the DOM tree as the new father node of the text node.

For example, the phone number processing interface therein may include at least one of a title bar, a phone dialing menu, a short message sending menu, a contact saving menu, and a number copying menu.

The link establishing module 12 may also be configured to link the prompting message of the valid phone number to the valid phone number when the text content includes a valid phone number.

The apparatus may also include a second pop up module (not shown), configured to pop up the prompting message.

Figure 6:
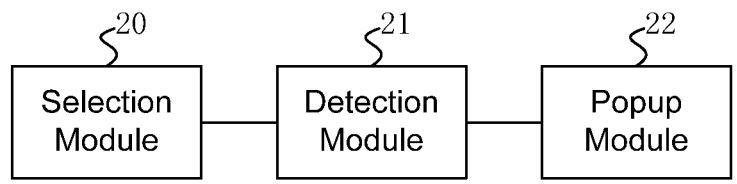
FIG. 6 is a structural representation for a phone number processing apparatus according to the example embodiments of the present disclosure.

FIG. 6 is a structural representation for a phone number processing apparatus according to the example embodiments of the present disclosure. The apparatus may include a selection module 20, a detection module 21, and a popup module 22.

The selection module 20 may be configured to select a phone number string with a preset length from the text area when the text area is unclickable. For example, selection of the phone number string with the present length from the text area may include: acquiring a string with the preset length forward and backward beginning from the user clicking site of the text area, and the preset length may be set up based on actual demand, for example, it may be 20 or 30 or 40 numbers, letters, and/or characters. If the phone number strings acquired after having traversed the text area are still shorter than the preset length, all web pages may be traversed at this time to acquire a sufficient length. Beginning from the character of the user clicking site, traversing may be performed respectively forward and backward, with separating and/or spacing characters being neglected, until characters that are not phone numbers are reached or the traversing has reached the head or end of the text, the text substrings with the range of the front and back stop sites then may be extracted as the phone number string. The detection module 21 may be connected to the selection module 20 and may be configured to perform phone number detection on the various phone number strings as selected by the selection module 20; the popup module 22 may be connected to the detection module 21 and may be configured to pop up the phone number processing interface when the detection module 21 detects that the phone number string is a valid phone number.

Figure 7:
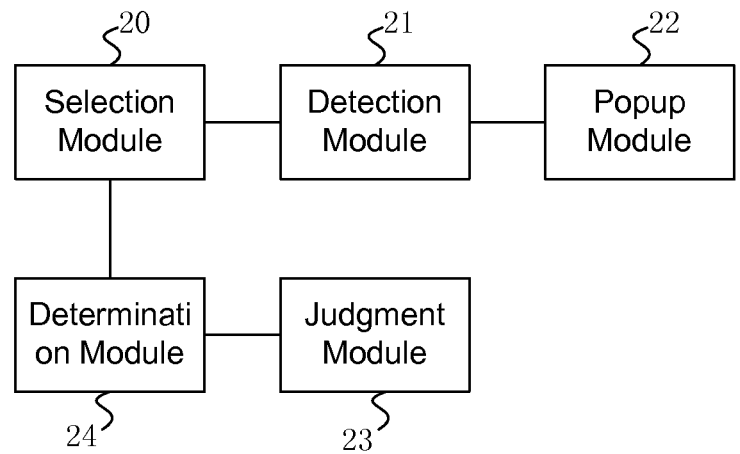
FIG. 7 is a structural representation for a phone number processing apparatus according to the example embodiments of the present disclosure.

FIG. 7 is a structural representation for a phone number processing apparatus according to the example embodiments of the present disclosure. In additional to the elements in FIG. 6, the apparatus in FIG. 7 may also include a judgment module 23 and a determination module 24.

The judgment module 23 may be configured to determine whether or not there is a link in the text area, before the selection module 20 selects the phone number string with the preset length from the text area, when the text area is unclickable; the determination module 24 may be connected to the judgment module 23 and may be configured to determine that the text area is clickable when the judgment module 23 determines that there is a link in the text area, and determine that the text area is unclickable when the judgment module 23 determines that there is no link in the text area. The selection module 20 may be connected to the determination module 24 and may be configured to select the phone number string with the preset length from the text area when the text area as selected by the user through the man-machine interface module is determined to be unclickable based on the determination module 24.

The phone number processing interface in the aforesaid embodiment includes at least one of the title bar, the phone dialing menu, the short message sending menu, the contact saving menu, and the number copying menu.

When the phone number processing apparatuses in FIG. 5-FIG. 7 processes a phone number, examples and descriptions are presented only on the basis of the division of the aforesaid various functional modules, and in practical application, the aforesaid functions may be assigned to different functional modules for completion based on needs, i.e., that the internal structure of the apparatus may be divided into different functional modules so as to complete all or some of the functions as described above. In addition, the phone number processing apparatus and the phone number processing method as provided by the aforesaid example embodiments may adopt the same conception, and the specific implementation procedures thereof are described in details in the method embodiments, which will not be further described here.

Referring back to FIG. 8. In the terminal device 800, the display unit of the may be a touch screen display, and the terminal device 800 also may include a memory, and one or more programs, wherein the one or more programs are stored in the memory. The processor may be configured to execute the instructions contained in the one or more programs for performing the following operations: When an unhidden text node in the document object model tree is unclickable, extracting the text content of the text node; performing phone number detection on the text content; when the text content includes a valid phone number, establishing a link for the valid phone number.

The memory may also be configured to store the following instructions: determining whether there is a link in the unhidden text node, when there is a link in the unhidden text node, determining that the unhidden text node is clickable; otherwise, when there is no link, determining that the unhidden text node is unclickable. Furthermore, the memory may also be configured to store the following instructions: traversing the DOM tree to acquire the unhidden text node in the document object model tree.

The memory may also be configured to store the following instructions: when the text content includes a valid phone number, creating a label for the text node based on the valid phone number, and the label links the valid phone number to the phone number processing interface; inserting the label as the new father node of the text node into the document object model tree.

The memory may also be configured to store the following instructions: when the user selects the text content, popping up the phone number processing interface to which the valid phone number in the text content links.

The phone number processing interface may include at least one of the title bar, the phone dialing menu, the short message sending menu, the contact saving menu, and the number copying menu.

The memory may also be configured to store the following instructions: when the text content includes a valid phone number, linking the prompting message of the valid phone number to the valid phone number.

The memory may also be configured to store the following instructions: when the user selects the text content through the man-machine interface module, popping up the prompting message on getting linked to the valid phone number in the text content.

The terminal device 800 may also be configured to execute another phone number processing method. Accordingly, the memory may be configured to store the following instructions: selecting a phone number string with a preset length from the text area when the text area is unclickable; performing phone number detection on the various the phone number strings; popping up the phone number processing interface when the phone number string is a valid phone number.

The memory may also be configured to store the following instructions: making judgment on whether or not there is a link in the text area; when there is a link in the text area, determining that the text area is clickable; otherwise, when there is no link, determining that the text area is unclickable.

The phone number processing interface may include at least one of the title bar, the phone dialing menu, the short message sending menu, the contact saving menu and the number copying menu.

Those of ordinary skill in the art may understand that all or some of the steps of the aforementioned embodiments may be completed through hardware and may also be completed through programs which instruct related hardware; The programs may be saved in a type of computer-readable memory medium and the aforementioned memory medium may be read-only memory, a disk or a compact disk, etc.

While example embodiments of the present disclosure relate to apparatuses and methods for phone number processing, the apparatuses and methods may also be applied to other Applications, such as brand name, product, other keyword, or graphic content recognition. The present disclosure intends to cover the broadest scope of systems and methods for content browsing, generation, and interaction.

Thus, example embodiments illustrated in FIGS. 1-8 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

We claim:

1. A method for phone number processing in a terminal device including a processor operating a browser, comprising:
   opening, by a processor, a web page on a browser, wherein:
   the web page comprises a logical structure of a document object model (DOM) tree, and
   the DOM tree includes a text node associated with text content in the web page;
   extracting, by the processor, the text content from the text node in the DOM tree when a user selects the text content and the text node is unclickable;
   detecting, by the processor, a string with a preset length from the text content;
   determining, by the processor, whether the string comprises a valid phone number; and
   in response to the determining that the string comprises the valid phone number:
      creating, by the processor, a label based on the valid phone number,
      linking, by the processor, the valid phone number to a phone number processing interface,
      inserting, by the processor, the label into the DOM tree as a new father node of the text node,
      moving, by the processor, the text node one level down in the DOM tree so that the text node becomes a child node of the label, and
      displaying, by the processor, the phone number processing interface on the web page.

2. The method of claim 1, further comprising:
   generating a hyperlink associated the string with the phone number processing interface when the string is the valid phone number.

3. The method of claim 2, further comprising:
   determining, by the processor, the text content being unclickable on the web page when the text node is not associated with a hyperlink; and
   determining, by the processor, the text content being clickable when the text node is associated with a hyperlink.

4. The method of claim 1, wherein the phone number processing interface comprises at least one of:
   a title bar,
   a phone dialing menu configured to dial the valid phone number,
   a short message sending menu configured to send a short message to the valid phone number,
   a contact saving menu configured to save the valid phone number in a list of contact,
   a number copying menu configured to save the valid phone number in a clip board, or
   a prompt message configured to provide information associated the valid phone number.

5. The method of claim 4, wherein the prompt message comprises information related to the valid phone number.

6. The method of claim 1, wherein the detecting the string with the preset length from the text content comprises:
   examining forward from where the user places a mouse pointer on the text content, neglecting separating characters, until reaching a first non-number character;
   examining backward from where the user places the mouse pointer on the text content, neglecting the separating characters, until reaching a second non-number character;
   selecting content between the first non-number character and the second non-number character; and
   identifying the content as the string by removing the separating characters between the first non-number character and the second non-number character.

7. A terminal device comprising:
   a non-transitory processor-readable storage medium including a set of instructions for phone number processing; and
   a processor in communication with the non-transitory processor-readable storage medium, wherein, when the processor executes the set of instructions, the processor is configured to:
   open a web page on a browser, wherein:
      the web page comprises a logical structure of a document object model (DOM) tree, and
      the DOM tree includes a text node associated with text content in the web page;
   extract the text content from the text node in the DOM tree when a user selects the text content and the text node is unclickable;
   detect a string with a preset length from the text content;
   determine whether the string comprises a valid phone number; and
   in response to the determining that the string comprises the valid phone number:
      create a label based on the valid phone number,
      link the valid phone number to a phone number processing interface,
      insert the label into the DOM tree as a new father node of the text node,
      move the text node one level down in the DOM tree so that the text node becomes a child node of the label, and
      display the phone number processing interface on the web page.

8. The terminal device of claim 7, wherein, when the processor executes the set of instructions, the processor is further configured to:
   generate a hyperlink associated the string with the phone number processing interface when the string is the valid phone number.

9. The terminal device of claim 8, wherein, when the processor executes the set of instructions, the processor is further configured to:
   determine the text content being unclickable on the web page when the text node is not associated with a hyperlink; and determine the text content being clickable when the text node is associated with a hyperlink.

10. The terminal device of claim 7, wherein the phone number processing interface comprises at least one of:
a title bar,
a phone dialing menu configured to dial the valid phone number,
a short message sending menu configured to send a short message to the valid phone number,
a contact saving menu configured to save the valid phone number in a list of contact,
a number copying menu configured to save the valid phone number in a clip board, or
a prompt message configured to provide information associated the valid phone number.

11. The terminal device of claim 10, wherein the prompt message comprises information related to the valid phone number.

12. The terminal device of claim 7, wherein, when the processor is configured to detect the string with the preset length from the text content, the processor is further configured to:
examine forward from where the user places a mouse pointer on the text content, neglecting separating characters, until reaching a first non-number character;
examine backward from where the user places the mouse pointer on the text content, neglecting the separating characters, until reaching a second non-number character;
select content between the first non-number character and the second non-number character; and
identify the content as the string by removing the separating characters between the first non-number character and the second non-number character.

13. A non-transitory processor-readable storage medium comprising a set of instructions for phone number processing, wherein the set of instructions is configured to direct a processor to perform acts of:
opening a web page on a browser, wherein:
the web page comprises a logical structure of a document object model (DOM) tree, and
the DOM tree includes a text node associated with text content in the web page;
extracting the text content from the text node in the DOM tree when a user selects the text content and the text node is unclickable;
detecting a string with a preset length from the text content;
determining whether the string comprises a valid phone number; and
in response to the determining that the string comprises the valid phone number:
creating a label based on the valid phone number,
linking the valid phone number to a phone number processing interface,
inserting the label into the DOM tree as a new father node of the text node,
moving the text node one level down in the DOM tree so that the text node becomes a child node of the label, and
displaying the phone number processing interface on the web page.

14. The non-transitory processor-readable storage medium of claim 13, wherein the set of instructions is configured to further direct the processor to perform acts of:
establishing a hyperlink associated the string with the phone number processing interface when the string is the valid phone number.

15. The non-transitory processor-readable storage medium of claim 14, wherein the set of instructions is further configured to direct the processor to perform acts of:
determining the text content being unclickable on the web page when the text node is not associated with a hyperlink; and
determining the text content being clickable when the text node is associated with a hyperlink.

16. The non-transitory processor-readable storage medium of claim 13, wherein the phone number processing interface includes at least one of:
a title bar,
a phone dialing menu configured to dial the valid phone number,
a short message sending menu configured to send a short message to the valid phone number,
a contact saving menu configured to save the valid phone number in a list of contact,
a number copying menu configured to save the valid phone number in a clip board, or
a prompt message configured to provide information associated the valid phone number.

17. The non-transitory processor-readable storage medium of claim 13, wherein the detecting the string with the preset length from the text content comprises:
examining forward from where the user places a mouse pointer on the text content, neglecting separating characters, until reaching a first non-number character;
examining backward from where the user places the mouse pointer on the text content, neglecting the separating characters, until reaching a second non-number character;
selecting content between the first non-number character and the second non-number character; and
identifying the content as the string by removing the separating characters between the first non-number character and the second non-number character.

* * * * *